United States Patent
Bailey

(10) Patent No.: US 8,348,312 B2
(45) Date of Patent: Jan. 8, 2013

(54) FRONT END STRUCTURES AND LOWER GRILLE ASSEMBLIES FOR VEHICLES

(75) Inventor: Stuart William Bailey, Tecumseh, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 310 days.

(21) Appl. No.: 12/791,138

(22) Filed: Jun. 1, 2010

(65) Prior Publication Data

US 2011/0291430 A1 Dec. 1, 2011

(51) Int. Cl.
*B60K 11/04* (2006.01)

(52) U.S. Cl. ................. 293/115; 180/68.6; D12/163

(58) Field of Classification Search .......... 52/473; 180/68.1, 68.4, 68.6; 293/115; 296/180.1, 296/180.5; 454/277, 279, 280; D12/163
See application file for complete search history.

(56) References Cited

U.S. PATENT DOCUMENTS

| | | | | |
|---|---|---|---|---|
| 1,206,166 A | * | 11/1916 | Summers | 293/115 |
| 1,445,354 A | * | 2/1923 | Raymond | 165/98 |
| 1,958,995 A | * | 5/1934 | Green | 52/666 |
| D119,379 S | * | 3/1940 | Cadwallader | D12/163 |
| D120,927 S | * | 6/1940 | Cadwallader | D12/163 |
| 2,358,486 A | * | 9/1944 | Zeeb | 293/113 |
| 2,585,220 A | * | 2/1952 | Brezek | 180/68.1 |
| 3,791,468 A | * | 2/1974 | Bryan, Jr. | 180/69.2 |
| 4,143,732 A | | 3/1979 | Schmude et al. | |
| 4,325,283 A | | 4/1982 | Bemiss | |
| D274,234 S | * | 6/1984 | Koyanagi | D12/163 |
| 4,566,407 A | * | 1/1986 | Peter | 123/41.48 |
| D283,019 S | * | 3/1986 | Teague et al. | D12/163 |
| D285,299 S | | 8/1986 | Wardle et al. | |
| 4,635,991 A | * | 1/1987 | Parno | 296/180.1 |
| D298,425 S | * | 11/1988 | Kubo | D12/163 |
| 5,924,756 A | * | 7/1999 | Homa | 296/91 |
| 6,012,761 A | | 1/2000 | Hellhake et al. | |
| D429,196 S | * | 8/2000 | Sacco et al. | D12/163 |
| D430,836 S | * | 9/2000 | Kitamura et al. | D12/163 |
| 6,116,365 A | * | 9/2000 | Preiss et al. | 180/68.1 |
| 6,405,819 B1 | * | 6/2002 | Ohkura et al. | 180/68.1 |
| 6,527,333 B2 | | 3/2003 | Hewitt et al. | |
| 6,886,872 B2 | * | 5/2005 | Matsumoto et al. | 293/115 |
| D529,419 S | * | 10/2006 | Richards et al. | D12/163 |
| D535,221 S | * | 1/2007 | Lau et al. | D12/163 |
| 7,455,351 B2 | * | 11/2008 | Nakayama et al. | 296/193.1 |
| D592,563 S | * | 5/2009 | Asakura et al. | D12/163 |
| 7,552,898 B2 | * | 6/2009 | Demange et al. | 248/27.3 |
| D602,409 S | | 10/2009 | Lamm et al. | |

(Continued)

FOREIGN PATENT DOCUMENTS

DE 3404887 A1 * 8/1985

(Continued)

*Primary Examiner* — Glenn Dayoan
*Assistant Examiner* — Paul Chenevert
(74) *Attorney, Agent, or Firm* — Dinsmore & Shohl LLP

(57) ABSTRACT

A lower grille assembly for connection with a front bumper structure of a vehicle includes a frame and a plurality of widthwise extending grille deflectors extending between sides of the frame, spaced-apart from each other along a height of the lower grille assembly. At least one grille deflector has one or more scoop regions having a trailing edge that extends upwardly such that the trailing edge is located above a leading edge of the scoop region for directing the air flowing by the trailing edge of the scoop region in an upward direction.

14 Claims, 4 Drawing Sheets

U.S. PATENT DOCUMENTS

| | | | |
|---|---|---|---|
| D603,304 S | 11/2009 | Lamm | |
| 7,661,753 B2 * | 2/2010 | Shinedling et al. | 296/180.5 |
| D616,342 S * | 5/2010 | Kim | D12/163 |
| D630,989 S * | 1/2011 | Nowells | D12/196 |
| D645,796 S * | 9/2011 | Osawa | D12/163 |
| 8,100,444 B2 * | 1/2012 | Erzgraber et al. | 293/120 |
| 8,128,153 B2 * | 3/2012 | Bernt et al. | 296/187.04 |
| 8,128,158 B1 * | 3/2012 | Davis et al. | 296/193.1 |
| 2002/0011742 A1 * | 1/2002 | Choi | 296/180.1 |
| 2011/0057480 A1 * | 3/2011 | Usoro et al. | 296/193.1 |
| 2011/0187134 A1 * | 8/2011 | Steller et al. | 293/115 |

FOREIGN PATENT DOCUMENTS

| | | |
|---|---|---|
| DE | 3630646 C1 * | 7/1987 |
| EP | 192934 A2 * | 9/1986 |
| GB | 2003801 A * | 3/1979 |
| JP | 60209369 A * | 10/1985 |
| JP | 61181724 A * | 8/1986 |

\* cited by examiner

FRONT END STRUCTURES AND LOWER GRILLE ASSEMBLIES FOR VEHICLES

TECHNICAL FIELD

The present specification generally relates to front end assemblies for vehicles and, more specifically, to grille assemblies for vehicles.

BACKGROUND

Radiators are typically used for cooling a vehicle engine by transferring heat from the engine to the atmosphere. The radiators are typically formed of numerous channels through which a coolant, such as a mixture of water and antifreeze, passes. The radiators are often mounted at a front of the vehicle to receive airflow due to forward movement of the vehicle. The airflow picks up the heat from the coolant as the air passes over the channels.

Grille assemblies are frequently used as a covering at the front of a vehicle to protect the radiator and engine of the vehicle while allowing air to pass therethrough for cooling. Grille deflectors may be provided in a spaced-apart relationship along a height of the grille assemblies to provide openings through which air may enter the engine compartment.

SUMMARY

In one embodiment, a vehicle front end assembly includes a bumper structure having a widthwise elongated opening located between an upper bumper portion and a lower bumper portion. A lower grille assembly has a covering portion exposed at the elongated opening of the bumper structure and comprises a plurality of widthwise extending grille deflectors spaced-apart from each other along a height of the lower grille assembly having a leading edge and a trailing edge. At least one grille deflector has a trailing edge that extends upwardly for directing the air flowing by the trailing edge in an upward direction toward a radiator.

In another embodiment, a lower grille assembly for connection with a front bumper structure of a vehicle includes a frame and a plurality of widthwise extending grille deflectors extending between sides of the frame, spaced-apart from each other along a height of the lower grille assembly. At least one grille deflector has one or more scoop regions having a trailing edge that extends upwardly such that the trailing edge is located above a leading edge of the scoop region for directing the air flowing by the trailing edge of the scoop region in an upward direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to front end assemblies of vehicles which generally include grille assemblies including lower grille assemblies. The lower grille assemblies may include grille deflectors that run widthwise across a width of the vehicle. The air deflectors may include an upward turn for guiding air passing through air inlet openings located between adjacent grille deflectors in an upward direction toward a radiator of the vehicle.

Figure 1:
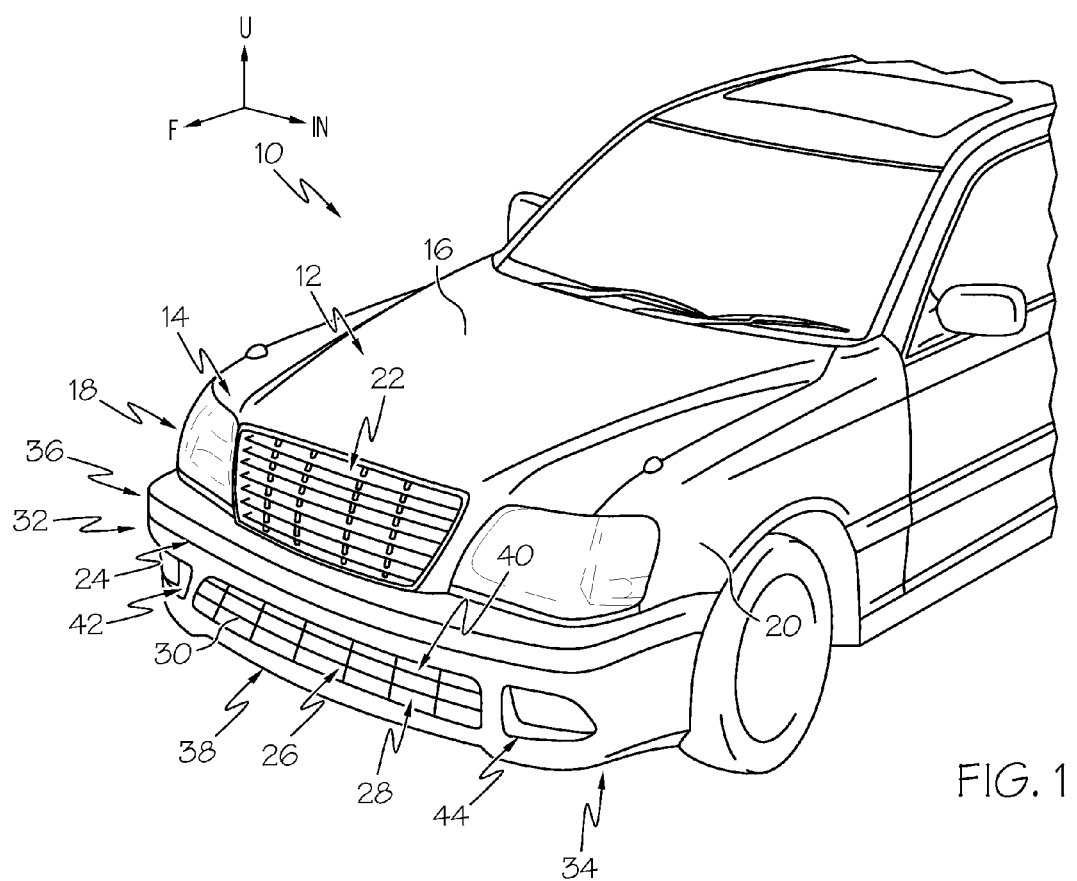
FIG. 1 is a front perspective view of a vehicle according to one or more embodiments shown and described herein.

FIG. 1 generally depicts one embodiment of a motor vehicle 10 where arrows F, U and IN denote forward, upward and widthwise inward directions respectively of the vehicle 10. The vehicle 10 includes a vehicle body 12 having a front end assembly 14 that includes a hood 16, front fenders 18 and 20, an upper grille assembly 22, a front bumper structure 24 and a lower grille assembly 26 that is connected to the front bumper structure 24 and is located between the front fenders 18 and 20. Generally, the lower grille assembly 26 includes a covering portion 28 with a number of horizontally disposed grille deflectors 30, a mesh or other suitable covering that protects a radiator behind the covering portion 28, while allowing air to flow past the covering and over the radiator.

An upper bumper portion 36 is located above the lower grille assembly 26 that extends in the widthwise direction between the first side 32 and the second side 34. A lower bumper portion 38 is located below the lower grille assembly 26 that extends in the widthwise direction between the first side 32 and the second side 34. The lower grille assembly 26 is located at an elongated grille opening 40 located between the first and second sides 32 and 34 and between the upper bumper portion 36 and lower bumper portion 38. Openings 42 and 44 are located outward of the lower grille assembly 26 on either side thereof that may be sized and located to receive, for example, lighting systems (e.g., fog lights). The front bumper structure 24 may be formed of any suitable material or combination of materials, such as a polymer material and formed by any suitable process or combination of processes, such as by molding, machining, etc.

Figure 2:
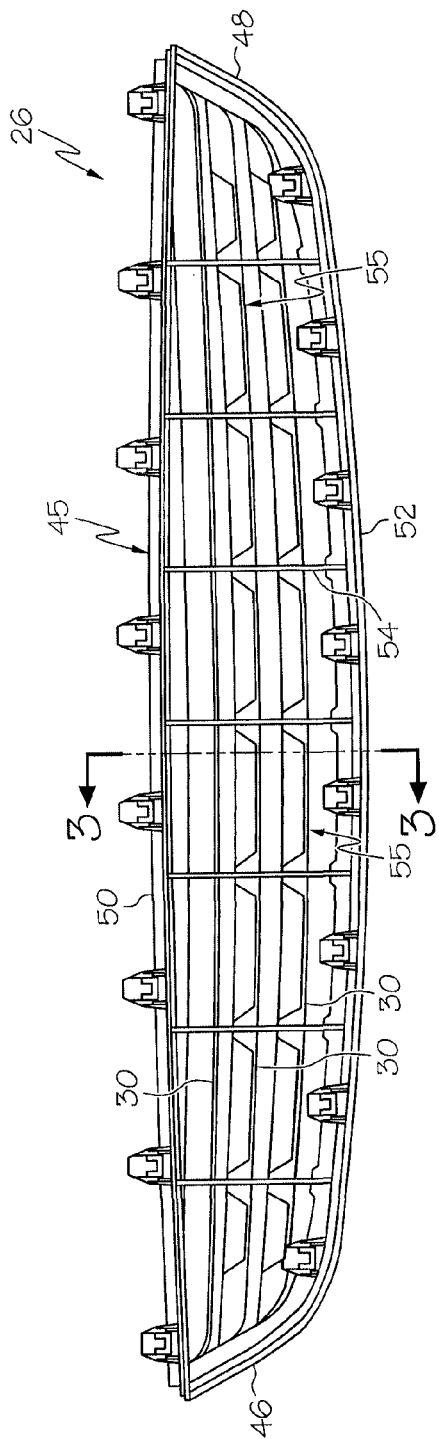
FIG. 2 is a front view of a lower grille assembly for use with the vehicle of FIG. 1 according to one or more embodiments shown and described herein.

Referring to FIG. 2, the lower grille assembly 26 is illustrated in isolation and may include a peripheral frame 45 including a first side 46 located near a passenger side front wheel, a second side 48 located near a driver side front wheel, a top 50 located near the upper bumper portion 36 and a bottom 52 located near the lower bumper portion 38. The grille deflectors 30 extend in the widthwise direction between the first side 46 and the second side 48. Vertical supports 54 intersect the grille deflectors 30 at locations spaced from each other in the vehicle widthwise direction. In some embodiments, there may be multiple, discrete scoop regions 55, spaced-apart from each other and each located between adjacent vertical supports 54.

Figure 3:
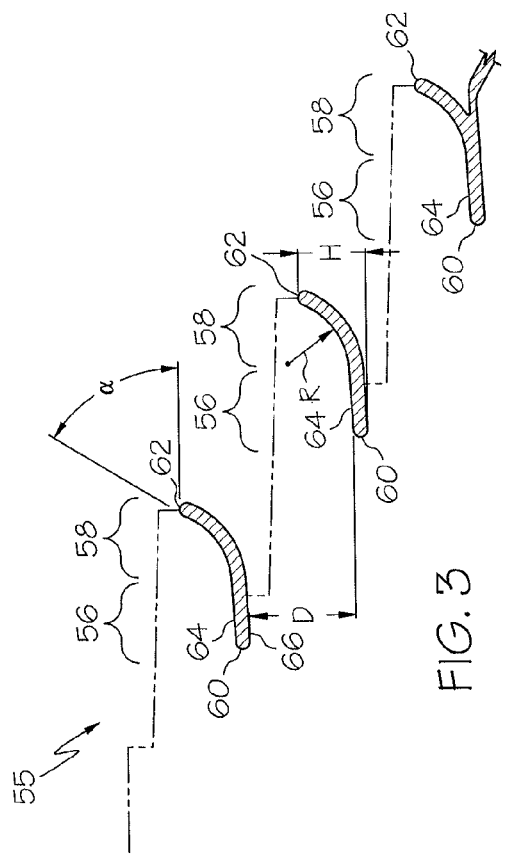
FIG. 3 is a side sectional view of a portion of the grille assembly of FIG. 2 illustrating grille deflectors according to one or more embodiments shown and described herein.

Referring to FIG. 3, the scoop regions 55 of the grille deflectors 30 may each include a substantially straight portion 56 and a bent portion 58. The straight portions 56 may be substantially parallel to each other while the bent portions 58 extend in an upward direction out of the planes defined by the straight portions 56. In some embodiments, each bent portion 58 may be greater than about 20 percent of a total length of the respective grille deflector 30 measured from a leading edge 60 to a trailing edge 62 of the grille deflector 30, such as greater than about 30 percent of the total length, such as greater than about 40 percent of the total length, such as greater than about 50 percent of the total length. In some embodiments, each bent portion 58 may be between about 20 percent and about 70 percent of the total length of the respective grille deflectors 30, such as between about 30 and about 60 percent of the total length. Multiple ones of the grille deflectors 30 and scoop regions 55 may have about the same total lengths and about the same bent portion lengths. In other embodiments, each grille deflector 30 and scoop region 55 may have a different total length and a different bent portion length compared to the other grille deflectors 30. In the illustrated embodiment, there are three grille deflectors 30, however, there may be more or less than three grille deflectors 30 depending, for example, on the size of the lower grille assembly 26.

Each scoop region 55 of the grille deflectors 30 includes an upper broad surface 64 and a lower broad surface 66 opposite the upper broad surface 64. The lower broad surfaces 66 of the scoop regions 55 may have a lowest point that is a preselected vertical distance D from a lowest point of the upper broad surface 64 of an adjacent scoop region 55. In some embodiments, D may be at most about 20 mm. The bent portions 58 of the scoop regions 55 may have a height H that is measured vertically from the lowest point of the lower broad surfaces 66 to the trailing edges 62. In some embodiments, H may be no greater than about 75 percent of D, such as no greater than about 60 percent of D, such as no greater than about 50 percent of D. In some embodiments, H may be no less than about 20 percent of D, such as between about 20 percent and about 75 percent of D.

The bent portions 58, in some embodiments, may be a circle segment having a radius R. The radii R of the bent portions may be about the same or they may be different. For example, the radii R may increase from the uppermost grille deflector 30 to the lowermost grille deflector 30. In some embodiments, R may be between about eight mm and about 11 mm, such as about 10 mm. As can be seen, the bent portions 58 may be located rearward (horizontally behind) the next upper adjacent bent portion 58. In some embodiments, the leading edge 60 of the grille deflectors 30 may be located rearward (horizontally behind) the next upper adjacent trailing edge 62. Other configurations may be used, such as all of the leading and/or trailing edges 60, 62 of the grille deflectors 30 may be aligned vertically.

The bent portions 58 may also have a max deflection angle α, where the deflection angle is defined by a line tangent to the upper broad surface 64 and the horizontal. In the embodiment of FIG. 3, the max deflection angle α is located where the upper broad surface 64 and the trailing edge 62 meet. In some embodiments, the max deflection angle is less than about 80 degrees, such as less than about 70 degrees, such as less than about 60 degrees, such as less than about 45 degrees. In some embodiments, the max deflection angle α may be between about 20 degrees and about 80 degrees, such as between about 45 degrees and about 80 degrees. In some instances, a max deflection angle of greater than 80 degrees may block air from entering the engine compartment.

Figure 4:
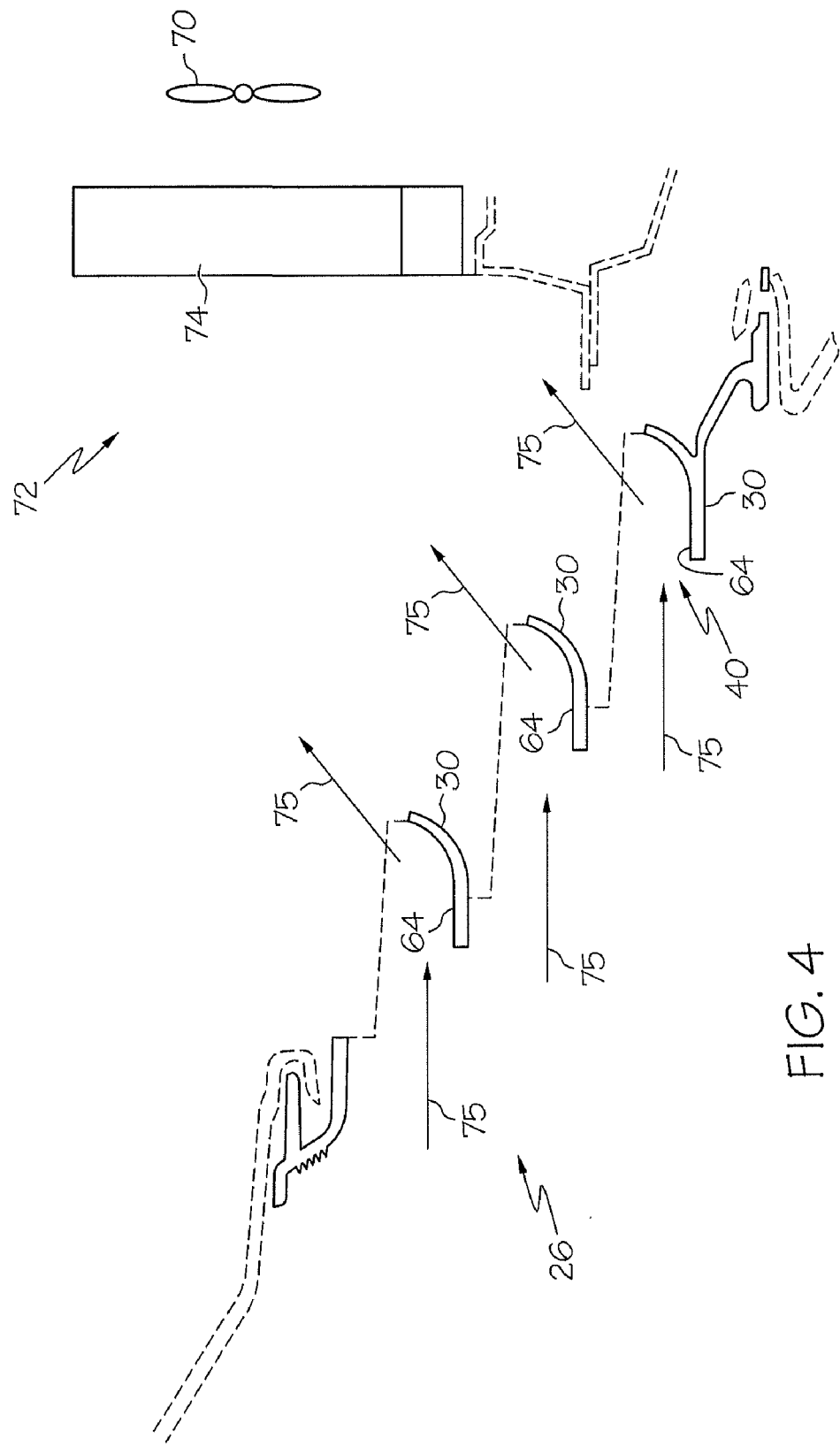
FIG. 4 is another side sectional view of a portion of the grille assembly of FIG. 2 in operation according to one or more embodiments shown and described herein.

Referring now to FIG. 4, operation of the lower grille assembly 26 will be described. An engine cooling fan 70 may draw cooler air into an engine compartment 72 from the surroundings. Air 75 being drawn through the opening 40 runs over the upper surfaces 64 thereby directing the bulk of the air 75 upwardly toward a radiator 74. The above-described grille deflectors 30 can deflect the bulk of the cooling air 75 upwardly toward the radiator 74, which can improve cooling.

Figure 6:
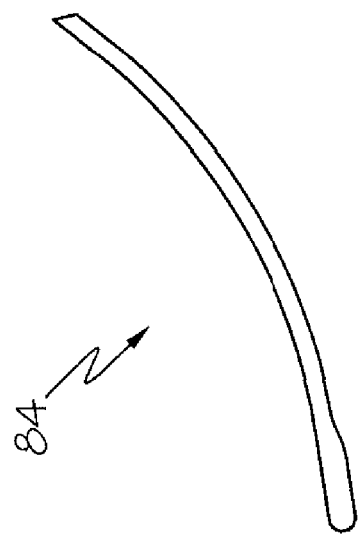
FIG. 6 is a side view of another embodiment of a grille deflector shown in isolation according to one or more embodiments shown and described herein.
Figure 5:
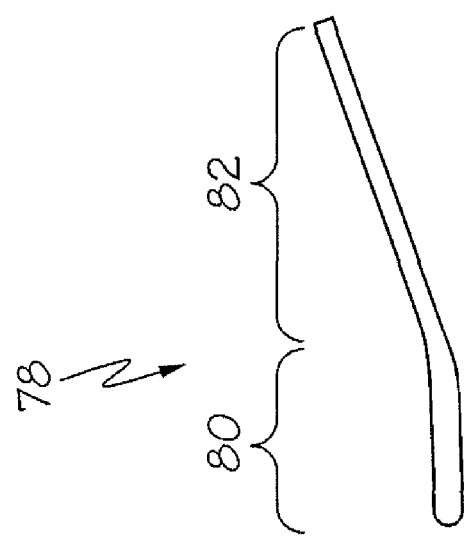
FIG. 5 is a side view of another embodiment of a grille deflector shown in isolation according to one or more embodiments shown and described herein.

While the exemplary embodiments described above illustrate a upwardly curved, concave bent portion 58. Other arrangements are possible, such as a grille deflector 78 including a straight portion 80 and a ramp portion 82, illustrated by FIG. 5. In another embodiment, illustrated by FIG. 6, the entire grille deflector 84 may be bent upwardly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A lower grille assembly for connection with a front bumper structure of a vehicle, the lower grille assembly comprising:
    a frame; and
    a plurality of widthwise extending grille deflectors extending between sides of the frame, spaced-apart from each other along a height of the lower grille assembly, wherein at least one grille deflector has one or more scoop regions having a trailing edge that extends upwardly such that the trailing edge is located above a leading edge of the scoop region for directing the air flowing by the trailing edge of the scoop region in an upward direction;
    wherein the at least one grille deflector includes a straight portion and a bent portion within the scoop region;
    wherein the bent portion extends upwardly to the trailing edge and the straight portion includes the leading edge;
    wherein the bent portion curves concave upwardly.

2. The lower grille assembly of claim 1, wherein the bent portion is greater than about 20 percent of a total length of the at least one grille deflector measured from the leading edge to the trailing edge.

3. The lower grille assembly of claim 1, wherein the bent portion has a max deflection angle of no greater than about 80 degrees.

4. The lower grille assembly of claim 1, wherein the bent portion is between about 20 percent and about 70 percent of a total length of the at least one grille deflector measured from the leading edge to the trailing edge.

5. The lower grille assembly of claim 1, wherein the at least one grille deflector is a first grille deflector, the lower grille assembly including a second grille deflector adjacent to and vertically above the first grille deflector, the second grille deflector having a scoop region having a trailing edge that extends upwardly for directing the air flowing by the trailing edge of the scoop region in an upward direction toward the radiator.

6. The lower grille assembly of claim 5, wherein the second grille deflector includes a straight portion and a bent portion within the scoop region of the second grille deflector, wherein the bent portion of the second grille deflector extends upwardly to the trailing edge of the second grille deflector and the straight portion includes the leading edge of the second grille deflector.

7. The lower grille assembly of claim 6, wherein the first grille deflector and the second grille deflector each has an upper broad surface and a lower broad surface opposite the upper broad surface within their respective scoop regions, the bent portion of the first grille deflector having a height measured vertically from a lowest point of the lower broad surface of the first grille deflector to the trailing edge of the first grille deflector that is no greater than about 75 percent of a vertical distance measured from a lowest point of the lower broad surface of the second grille deflector to a lowest point of the upper surface of the first grille deflector.

8. The lower grille assembly of claim 7, wherein the bent portion of the first grille deflector is located rearward of the bent portion of the second grille deflector.

9. A vehicle front end assembly, comprising:
a bumper structure having a widthwise elongated opening located between an upper bumper portion and a lower bumper portion; and
a lower grille assembly having a covering portion exposed at the elongated opening of the bumper structure and comprising a plurality of widthwise extending grille deflectors spaced-apart from each other along a height of the lower grille assembly and having a leading edge and a trailing edge, wherein at least one grille deflector has a trailing edge that extends upwardly for directing the air flowing by the trailing edge in an upward direction toward a radiator;
wherein the at least one grille deflector includes a straight portion and a bent portion, wherein the bent portion extends upwardly to the trailing edge and the straight portion includes the leading edge;
wherein the bent portion curves concave upwardly and is between about 20 percent and about 70 percent of a total length of the at least one grille deflector measured from the leading edge to the trailing edge.

10. The vehicle front end assembly of claim 9, wherein the bent portion has a max deflection angle of no more than about 80 degrees.

11. The vehicle front end assembly of claim 9, wherein the at least one grille deflector is a first grille deflector, the lower grille assembly including a second grille deflector adjacent to and vertically above the first grille deflector, the second grille deflector having a trailing edge that extends upwardly for directing the air flowing by the trailing edge of the second grille deflector in an upward direction toward the radiator.

12. The vehicle front end assembly of claim 1, wherein the second grille deflector includes a straight portion and a bent portion, wherein the bent portion of the second grille deflector extends upwardly to the trailing edge of the second grille deflector and the straight portion includes the leading edge of the second grille deflector.

13. The vehicle front end assembly of claim 12, wherein the first grille deflector and the second grille deflector each has an upper broad surface and a lower broad surface opposite the upper broad surface, the bent portion of the first grille deflector having a height measured vertically from a lowest point of the lower broad surface of the first grille deflector to the trailing edge of the first grille deflector that is no greater than about 75 percent of a vertical distance measured from a lowest point of the lower broad surface of the second grille deflector to a lowest point of the upper surface of the first grille deflector.

14. The vehicle front end assembly of claim 13, wherein the bent portion of the first grille deflector is located rearward of the bent portion of the second grille deflector.

* * * * *

UNITED STATES PATENT AND TRADEMARK OFFICE
CERTIFICATE OF CORRECTION

PATENT NO. : 8,348,312 B2  
APPLICATION NO. : 12/791138  
DATED : January 8, 2013  
INVENTOR(S) : Stuart William Bailey Page 1 of 1

It is certified that error appears in the above-identified patent and that said Letters Patent is hereby corrected as shown below:

In the Claims:

Claim 12, column 6, line 19, change "claim 1" to "claim 11".

Signed and Sealed this  
Twentieth Day of August, 2013

Teresa Stanek Rea  
*Acting Director of the United States Patent and Trademark Office*